US005587650A

United States Patent [19]
Massie

[11] Patent Number: 5,587,650
[45] Date of Patent: Dec. 24, 1996

[54] HIGH PRECISION SWITCHING REGULATOR CIRCUIT

[75] Inventor: Harold L. Massie, West Linn, Oreg.

[73] Assignee: Intel Corporation, Santa Clara, Calif.

[21] Appl. No.: 355,027

[22] Filed: Dec. 13, 1994

[51] Int. Cl.$^6$ .................................................. G05F 1/575
[52] U.S. Cl. .................................................. 323/282
[58] Field of Search ...................................... 323/282, 284

[56] References Cited

U.S. PATENT DOCUMENTS

| | | | |
|---|---|---|---|
| 4,719,552 | 1/1988 | Albach et al. | 323/282 |
| 4,791,350 | 12/1988 | Roof | 323/284 |
| 4,967,138 | 10/1990 | Obergfell et al. | 323/286 |
| 5,214,561 | 5/1993 | Morita | 323/282 |
| 5,399,958 | 3/1995 | Iyoda | 323/282 |
| 5,408,173 | 4/1995 | Knapp | 323/282 |
| 5,430,364 | 7/1995 | Gibson | 323/285 |

*Primary Examiner*—Jeffrey L. Sterrett
*Attorney, Agent, or Firm*—Blakely, Sokoloff, Taylor & Zafman

[57] ABSTRACT

A switching regulator circuit. The switching regulator circuit comprises a primary feedback loop and a secondary feedback connection. The primary feedback loop comprises a drive circuit, a switching transistor, an output stage, a voltage divider circuit, and a pre-drive circuit that are coupled in series. The pre-drive circuit is coupled to the drive circuit to close the primary feedback loop. The primary feedback loop uses negative feedback to output a predetermined output voltage. The secondary feedback connection is coupled between an input and an output of the pre-drive circuit. The secondary feedback connection uses regenerative feedback to provide hysteresis such that the primary feedback loop oscillates. The switching regulator circuit thus regulates the output voltage without requiring a separate oscillator circuit.

14 Claims, 4 Drawing Sheets

HIGH PRECISION SWITCHING REGULATOR CIRCUIT

FIELD OF THE INVENTION

The present invention relates generally to switching voltage regulators and more specifically to a DC—DC converter.

BACKGROUND OF THE INVENTION

The power supplies in a computer system are designed to meet the specific power requirements of the integrated circuit chips (ICs) that are the components of the system. The nominal operating voltages for the ICs are typically known because most ICs are manufactured to meet industry standards for device operation. For example, common nominal supply voltages include 5.0 volts and 3.3 volts.

When an IC having a different nominal operating voltage is used in a computer system, a DC—DC converter may be used to convert a DC input voltage to a desired DC output voltage. DC—DC converters may be broadly classified as linear voltage regulators and switching voltage regulators, and switching voltage regulators may be further classified as pulse-width-modulated (PWM) converters and resonant converters. Switching voltage regulators are often preferred over linear voltage regulators due to their superior efficiency.

Figure 1:
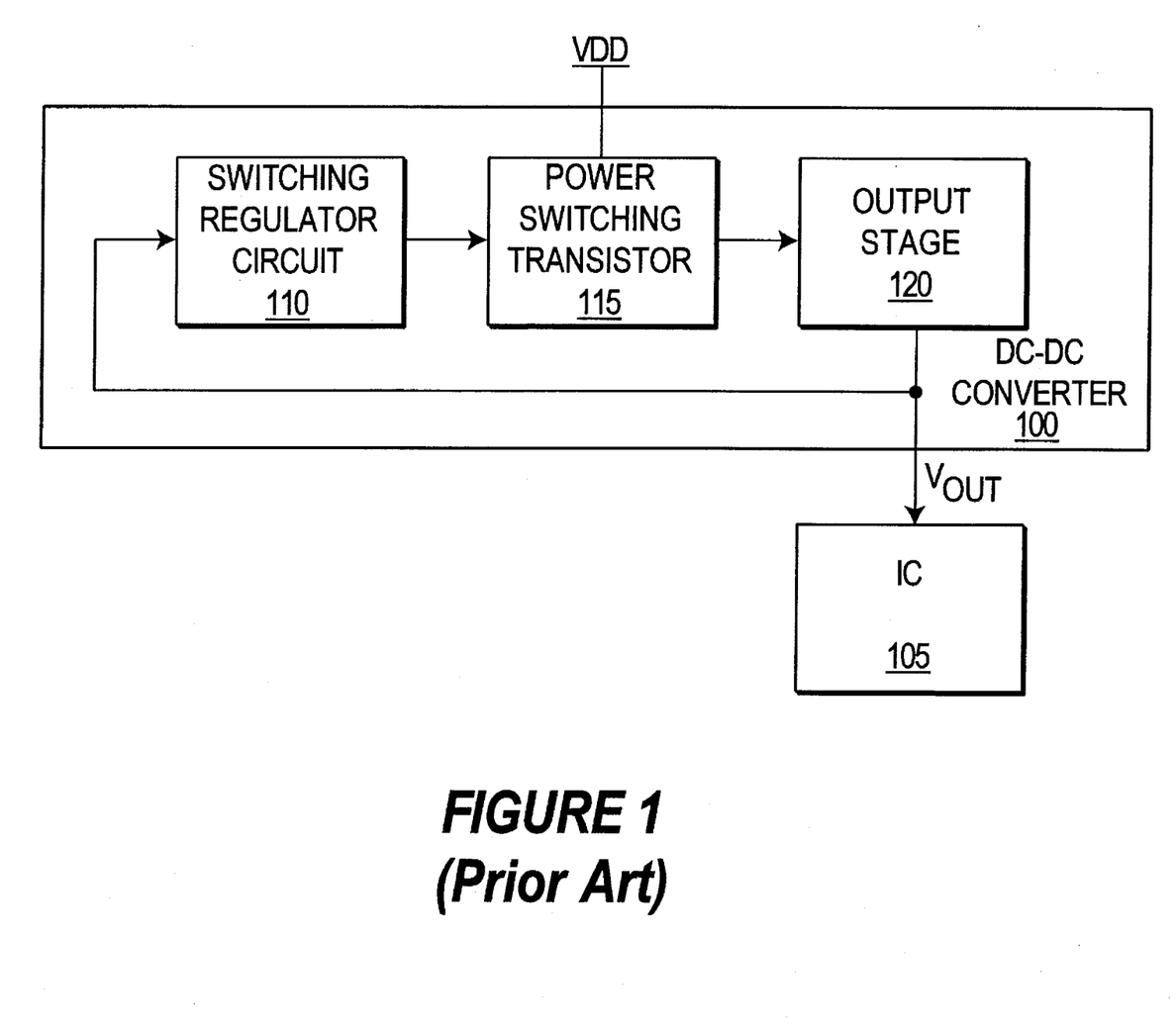
FIG. 1 shows a prior art DC—DC converter.

FIG. 1 shows a DC—DC converter according to the prior art. The DC—DC converter 100 includes a switching regulator circuit 110, a power switching transistor 115, and an output stage 120 that provides a DC output voltage $V_{out}$ to the IC 105. The DC output voltage $V_{out}$ output by the output stage 120 is fed back to the switching regulator circuit 110. The switching regulator circuit 110 is often a commercially available IC that provides a drive signal for switching the power switching transistor 115 on and off in response to the sensed value of $V_{out}$. The switching regulator circuit 110 typically includes an internal oscillator circuit that outputs the drive signal at a fixed frequency. The switching regulator modulates the pulse width of the drive signal to vary the amount of time that the power switching transistor 115 is switched on. When switched on, the power switching transistor 115 couples the DC input voltage VDD to the output stage 120. The DC output voltage $V_{out}$ is a function of the duty cycle of the switching regulator circuit 110 and DC input voltage VDD. For example, if the switching regulator circuit 110 causes the power switching transistor 115 to be on sixty percent of the time, the DC output voltage $V_{out}$ supplied to the IC 105 by the output stage 120 is approximately equal to sixty percent of VDD.

When tight regulation of the DC output voltage $V_{out}$ is desired, the use of a commercial IC as the switching regulator circuit 110 can increase the cost of the DC—DC converter 100 significantly. However, the use of a switching regulator IC often provides high efficiency regulation and requires few components to implement. It is therefore desirable to provide a new type of high precision, reduced cost switching regulator circuit that provides similar or improved performance when compared to switching regulator circuits and ICs of the prior art.

SUMMARY OF THE INVENTION

Therefore, one object of the invention is to provide a switching regulator circuit that provides switching regulation without requiring a separate oscillator circuit.

Another object of the invention is to provide a switching regulator circuit that provides precision switching regulation without requiring a commercial switching regulator IC.

A switching regulator circuit is described. The switching regulator circuit comprises a primary feedback loop and a secondary feedback connection. The primary feedback loop comprises a drive circuit, a switching transistor, an output stage, and a pre-drive circuit that are coupled in series. The pre-drive circuit is coupled to the drive circuit to close the primary feedback loop. The primary feedback loop uses negative feedback to output a predetermined output voltage. The secondary feedback connection is coupled between an input and an output of the pre-drive circuit. The secondary feedback connection uses regenerative feedback to provide hysteresis such that the primary feedback loop oscillates. The switching regulator circuit thus regulates the output voltage without requiring a separate oscillator circuit.

According to one embodiment, the drive circuit outputs a drive signal to the switching transistor in response to a pre-drive signal supplied by the pre-drive circuit. The switching transistor is switched on and off in response to the drive signal, coupling and decoupling the input voltage at the drain of the switching transistor to the source of the switching transistor. The output stage is coupled to the source of the switching transistor and outputs an output voltage in response to the input voltage being coupled and decoupled from the source of the switching transistor. The secondary feedback connection is coupled between the input and the output of the pre-drive circuit for providing a hysteresis voltage to the input of the pre-drive circuit, wherein the hysteresis voltage is out of phase with the output voltage. Together, the output voltage and the hysteresis voltage comprise a sense voltage that is sensed by the pre-drive circuit and compared to a reference of the pre-drive circuit. The pre-drive circuit outputs the pre-drive signal in response to the comparison between a reference voltage and the sense voltage.

Other objects, features, and advantages of the present invention will be apparent from the accompanying drawings and from the detailed description which follows below.

BRIEF DESCRIPTION OF THE DRAWINGS

The objects, features, and advantages of the method and apparatus of the present invention will be apparent from the following detailed description of the invention in which.

DETAILED DESCRIPTION

Figure 2:
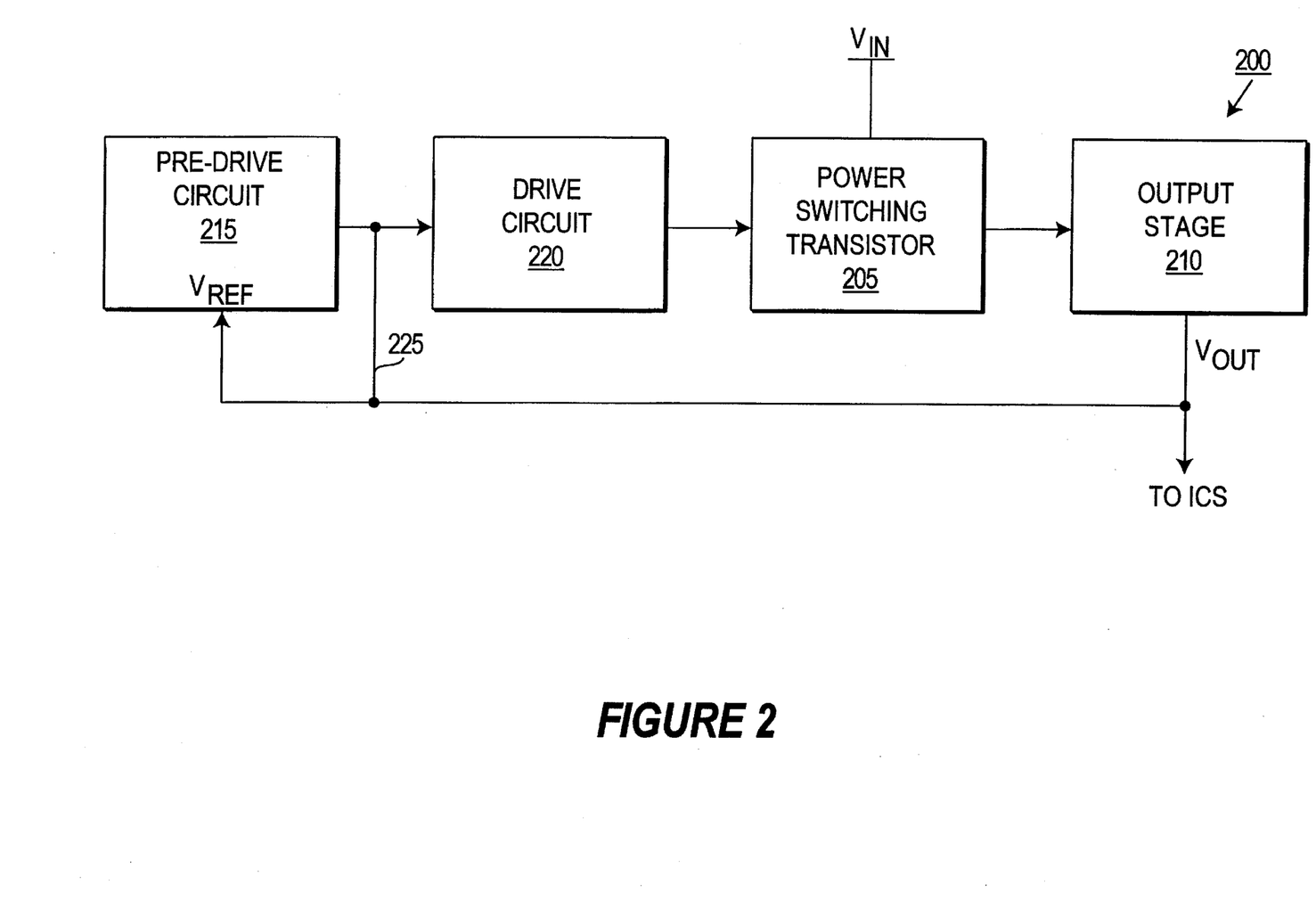
FIG. 2 is block diagram of a novel DC—DC converter according to one embodiment.

FIG. 2 shows an improved DC—DC converter in block diagram form. The DC—DC converter 200 includes a power switching transistor 205, an output stage 210, a pre-drive circuit 215, and a drive circuit 220. The power switching transistor 205 is switched on and off, coupling and decoupling the DC input voltage to the output stage, in response to a series of drive pulses provided by the drive circuit 220. The output stage 210 averages the input pulses to output a DC output voltage $V_{out}$ and associated ripple voltage. The pre-drive circuit 215 includes a precision voltage reference circuit and is coupled to sense and compare the output voltage $V_{out}$ to a reference voltage $V_{ref}$. The pre-drive circuit 215 provides a pre-drive signal to the input of the drive circuit 220 for varying the duration and frequency of the drive pulses provided by the drive circuit 220. The pre-drive signal is provided in response to the comparison between $V_{out}$ and $V_{ref}$.

A separate oscillator circuit is not provided. Instead, the feedback loop comprising the power switching transistor 205, the output stage 210, the pre-drive circuit 215, and the drive circuit 220 includes a regenerative feedback connection 225 between the input and the output of the pre-drive circuit 215 that provides hysteresis such that the pre-drive circuit 215 oscillates, periodically pulsing the pre-drive signal, which, in turn, results in an oscillatory ripple voltage at the output of the output stage 210. The oscillatory ripple voltage causes the sensed value of $V_{out}$ to change, and the hysteresis voltage provided by the feedback connection 225 is out of phase with $V_{out}$ such that pre-drive circuit and the feedback loop continue to oscillate. The feedback loop may vary both the frequency and the pulse width of the drive pulses so that the appropriate output voltage $V_{out}$ is output by the DC—DC converter 200. No switching regulator IC is required, which may significantly reduce the cost of the DC—DC converter 200 when compared to prior DC—DC converters.

Figure 3:
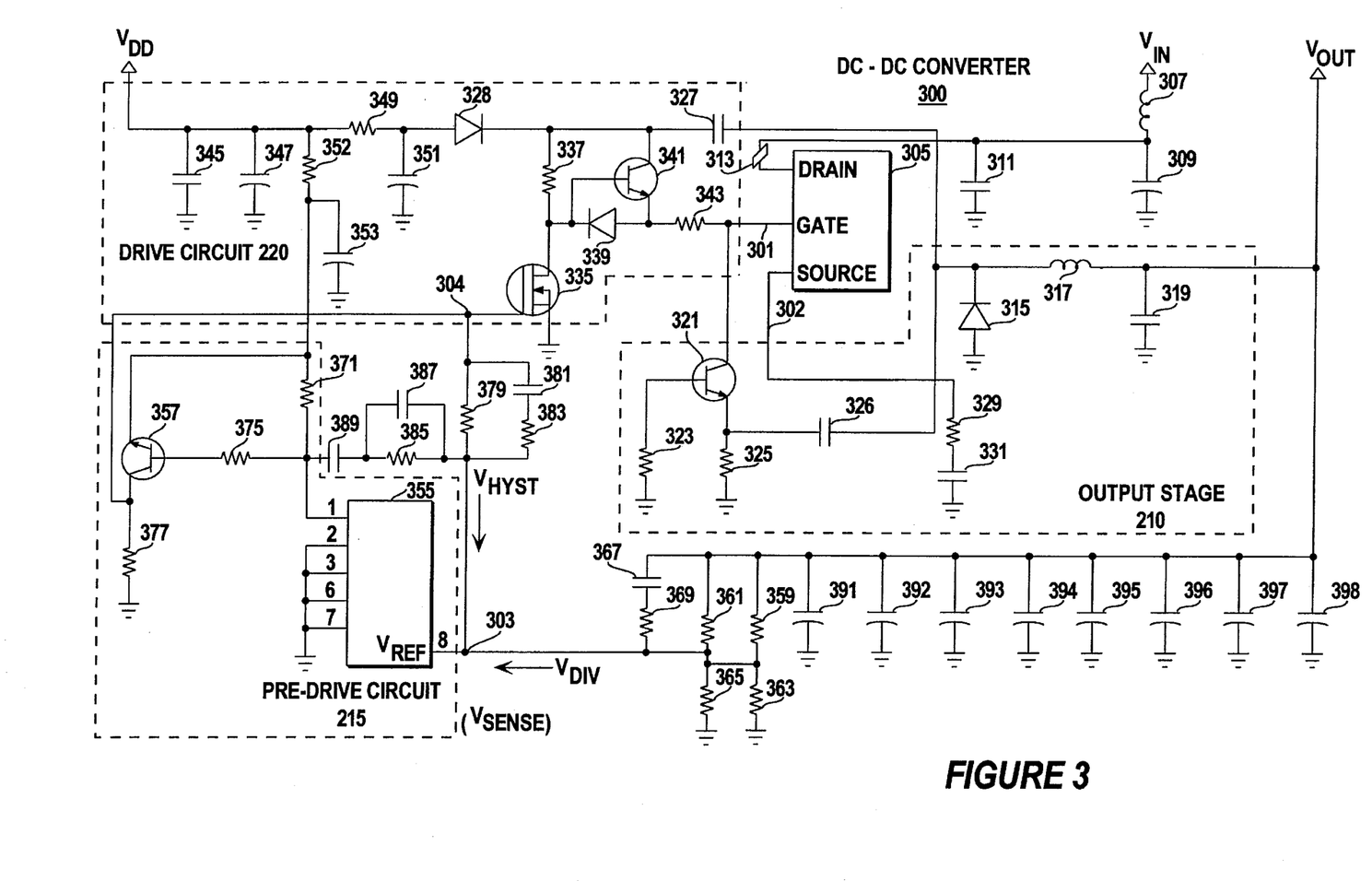
FIG. 3 is schematic of a novel DC—DC converter according to one embodiment.

As will be discussed below, the pre-drive circuit 215 includes a voltage reference circuit (as shown in FIG. 3) that compares a sense voltage $V_{sense}$ to a high accuracy internal set-point reference voltage $V_{ref}$. The sense voltage $V_{sense}$ depends on the output voltage $V_{out}$ of the DC—DC converter 200 and a hysteresis voltage $V_{hyst}$ that is out of phase with the output voltage. The hysteresis voltage $V_{hyst}$ is provided by the feedback connection 225 in response to the pre-drive signal. The output of the voltage reference circuit oscillates in response to the comparison between the sense voltage $V_{sense}$ and the internal set-point reference voltage $V_{ref}$.

For one embodiment, the voltage reference circuit acts as a current sink that sinks more or less current depending on the result of the comparison between $V_{sense}$ and $V_{ref}$. The amount of current that is drawn by the voltage reference circuit bears a linear relationship to the comparison between the $V_{sense}$ and $V_{ref}$ over a range of values for $V_{sense}$. The hysteresis voltage forces the output of the voltage reference circuit to oscillate, wherein the gain of the main feedback loop primarily determines the frequency of oscillation, although the inductor and the capacitor of the output stage do have an effect. Pre-drive pulses are generated by the remaining circuitry of the pre-drive circuit 215 in response to the oscillating output signal of the voltage reference circuit. The voltage reference circuit varies the frequency and pulse width of pre-drive pulses in response to the comparison between $V_{sense}$ and $V_{ref}$. Thus, the function of a switching regulator IC may be performed at a reduced cost by a voltage reference circuit.

FIG. 3 is a schematic of a novel DC—DC converter. The DC—DC converter 300 includes a power switching transistor 305, which is shown as an enhancement mode field effect transistor (FET) having a drain, a gate, and a source. The power switching transistor 305 alternatively may be a bipolar junction transistor (BJT), or any other appropriate device. The gate of the power switching transistor 305 is coupled to a node 301 for receiving drive pulses from the drive circuit 220; the drain is coupled to receive the DC input voltage; and the source is coupled to the output stage 210 at node 302.

The path from the DC input voltage $V_{in}$, which may be, for example, 5.0 volts (VCC) or 12.0 volts (VDD), includes inductor 307, capacitors 309 and 311, and ferrite bead 313. Inductor 307 is provided to isolate the DC input voltage supply from the current pulses that result from switching transistor 305 on and off. Capacitor 309 stores energy that is supplied to the source of power switching transistor 305 when transistor 305 is switched on, and capacitor 311 acts as a high frequency bypass capacitor. Ferrite bead 313 prevents the drive circuit 220, power switching transistor 305, and output stage 210 from oscillating during switching transitions for transistor 305. Wherein the DC input voltage is VCC, the value of the inductor 307 may be 1.0 µH, the value of capacitor 309 may be 1500 µF, the value of capacitor 311 may be 0.1 µF, and the value of ferrite bead 313 may be 95Ω. The values of the inductor 307, the capacitors 309 and 311, and the ferrite bead 313 may be adjusted to provide optimized performance for different DC input voltages.

The output stage 210 of the DC—DC converter 300 generally includes catch diode 315, inductor 317, and capacitor 319. The output stage also includes bypass capacitors 391–398 coupled between the output of the DC—DC converter and ground for filtering load transients. For this example, the parallel capacitance of capacitors 391–398 is 2200–3000 µF. Of course, the capacitance of bypass capacitors 391–398 may be provided through the use of a single capacitor having the appropriate capacitance. An RC snubber circuit comprising a resistor 329 is coupled in series with a capacitor 331 is coupled between the source of power switching transistor 305 and ground for filtering high frequency noise at the source of power switching transistor 305 during switching transitions for the power switching transistor 305.

When the power switching transistor 305 is switched on, the DC input voltage at the drain of power switching transistor 305 is conducted to the source of power switching transistor 305, which is coupled to catch diode 315 and inductor 317. When the power switching transistor 305 is switched on, catch diode 315 is back-biased, and current flows through the inductor 317, which stores energy and provides the output load current to any devices (load) coupled to the output. When the power switching transistor 305 is switched off, the inductor 317 releases the stored energy, causing the catch diode 315 to go into conduction, and a load current continues to flow through the inductor 317. The inductor 317 and the capacitor 319 filter the voltage pulses of the power switching transistor into an average DC output voltage $V_{out}$ with an associated ripple voltage. Wherein the desired DC output voltage $V_{out}$ is 3.3 volts and the DC input voltage is 5.0 volts, the value of the inductor 317 may be 7.9 µH, and the value of the capacitor 319 may be 1.0 µF. Almost any DC input voltage $V_{in}$ may be used to produce a desired DC output voltage $V_{out}$ so long as $V_{in}$ is greater than $V_{out}$.

The purpose of the catch diode 315 is to prevent a voltage level that is greater than one diode drop below ground from being presented at the source of power switching transistor 305. Typically, catch diode 315 is unable to go into conduction instantaneously, and a significant negative voltage may be produced at the source of power switching transistor 305 when the power switching transistor 305 is initially turned off. A significant negative voltage on the source of power switching transistor 305 can result in the power switching transistor 305 conducting current when the drive pulse is removed, at which time the gate voltage of transistor 305 is discharged towards ground, and the power switching transistor 305 is ostensibly switched off. Significant switching losses can result. The output stage 210 of the DC—DC converter 300 therefore includes a quick shut-off circuit that applies a negative voltage to the gate of power switching transistor 305 when the power switching transistor 305 is switched off. The quick shut-off circuit includes npn transistor 321, resistors 323 and 325, and capacitor 326.

The quick shut-off circuit is a common-base amplifier circuit wherein the emitter of 321 is coupled to the source of power switching transistor 305 through the capacitor 326, and the collector of transistor 321 is coupled to the gate of power switching transistor 305. When the drive pulse is removed from the gate of power switching transistor 305 to switch off power switching transistor 305, the voltages at both the gate and the source of power switching transistor 305 fall towards ground. The negative going edge on the source of power switching transistor 305 is coupled into the capacitor 326, which produces a negative voltage at the emitter of transistor 321. This negative spike causes transistor 321 to saturate, and the negative voltage appears on the collector of transistor 321, which is coupled to the gate of power switching transistor 305. The negative voltage forces the gate of power switching transistor 305 below ground, reducing the positive difference in potential between the gate and the source of power switching transistor 305 such that the gate-source voltage of power switching transistor 305 is less than the threshold voltage for the power switching transistor 305. For the present embodiment, the negative gate voltage is applied for approximately 200 nanoseconds. The npn transistor 321 may be a 2N4401, the value of resistor 323 may be one kΩ, the value of resistor 325 may be 100Ω, and the value of capacitor 326 may be 0.01 µF.

The drive circuit 220 of DC—DC converter 300 includes transistors 335 and 341, resistors 337, 343, 349, and 352, diodes 328 and 329, and capacitors 345, 347, 351, 353, and 327. The pre-drive signal is provided to the gate of transistor 335 at node 304 for switching field effect transistor 335 on and off. When transistor 335 is switched off, npn transistor 341 provides a high current drive signal that is approximately equal to VDD+VIN at the gate of power switching transistor 305 such that power switching transistor 305 is switched on quickly. Transistor 341 is part of a bootstrap circuit that further includes diode 328, resistors 337 and 343, and capacitor 327. Transistor 341 may be 2N4401, the value of resistor 337 may be one kΩ, the value of resistor 343 may be 24Ω, and the value of capacitor 327 may be 0.1 µF. When the pre-drive signal is sufficiently high, transistor 335 is switched on, which provides a path from the gate of power switching transistor 305, through diode 339, to ground. Thus, diode 339 provides a high gate sink current such that the gate of power switching transistor 305 is discharged quickly towards ground, and power switching transistor 305 is switched off quickly to reduce switching losses.

Resistor 349 and capacitor 351 are provided as a filter circuit for filtering noise from the DC input voltage line. Such noise may be injected by the operation of diode 328. The value of resistor 349 may be 10Ω, while the value of capacitor 351 may be 1.0 µF. Resistor 352 and capacitor 353 also filter noise from the DC input voltage line, and the values of resistor 352 and capacitor 353 may be equivalent to the values of resistor 349 and capacitor 351, respectively.

The pre-drive circuit 215 supplies pre-drive pulses to node 304 for switching transistor 335 on. The pre-drive circuit includes precision voltage reference IC 355, transistor 357, and resistors 371–377. The voltage reference IC 355 outputs an oscillating signal that biases the base of transistor 357 to periodically output pre-drive pulses at its collector.

For one embodiment, the voltage reference IC 355 receives the ripple voltage of the output voltage $V_{out}$ and outputs an amplified signal that is essentially the ripple voltage phase-shifted by 90 degrees. When transistor 357 is switched off, node 304 is pulled to ground by resistor 377, and transistor 335 of the drive circuit is switched off. The drive signal is applied to the gate of the power switching transistor 305 at node 301 for as long as transistor 335 of the drive circuit is switched off. When transistor 357 is switched on, node 304 is pulled towards VDD. The transistor 335 is switched on when the voltage at node 304 exceeds the threshold voltage of transistor 335. The drive signal is removed from the gate of the power switching transistor 305 when transistor 335 switches on.

The voltage reference IC 355 may be a TL431A voltage reference chip or equivalent, and the pin designations shown in FIG. 3 are those of a TL431A. The TL431A is a high precision voltage reference having an internal reference voltage $V_{ref}$ that is accurate within one percent of its nominal value. The input (pin 8) of the voltage reference IC 355 receives a sense voltage $V_{sense}$ at node 303 that depends on the output voltage $V_{out}$ supplied by the output stage and a hysteresis voltage provided by the feedback connection between node 303 and node 304.

The function of the voltage reference IC 355 may alternatively be performed by a circuit comprised of discrete components. For example, the output of an operational amplifier may be used to provide a base current to an npn transistor, and the current at the collector of the transistor may be used to define the pre-drive voltage at node 304. A positive terminal of the operational amplifier may be coupled to node 303, and a negative terminal of the operational amplifier may be coupled to a voltage reference. The base current supplied to the transistor and, thus, the collector current of the transistor depend on the difference between the voltage at node 303 and the voltage reference. Any similar or equivalent circuit may be used.

The sense voltage $V_{sense}$ at node 303 is set primarily by a voltage $V_{div}$ output by the voltage divider circuit that comprises resistors 359–363. Resistors 361 and 365 are high accuracy resistors (e.g. 0.1%) that set the relationship between the sense voltage $V_{sense}$ and the output voltage $V_{out}$. Resistors 359 and 363 are provided as trimming resistors to more precisely define the voltage divider relationship. The values of resistors 361 and 365 may be 1 kΩ and 2.8 kΩ, respectively. The sense voltage $V_{sense}$ also depends on the value of the pre-drive signal, which is coupled to the input of the voltage reference IC 355 via resistor 379. Capacitor 381 and resistor 383 are coupled in parallel with resistor 379 for providing transient positive feedback to make the switching fast and to prevent false drive pulses due to noise. The voltage divider circuit is provided to reduce the output voltage $V_{out}$ to a value that is near the nominal value of the reference voltage $V_{ref}$, which may be 2.5 volts. A voltage divider circuit is not needed if the nominal value of the output voltage $V_{out}$ is already equal to the nominal reference voltage $V_{ref}$. If the nominal output voltage $V_{out}$ is less than the reference voltage $V_{ref}$, an offset voltage may be added to node 303 such that the sense voltage $V_{sense}$ is near the nominal value of the reference voltage $V_{ref}$. This may be done, for example, by coupling a voltage output by an offset circuit to node 303 via a resistor. The offset circuit may include a precision voltage reference for outputting a high precision offset voltage.

The values of resistors 359–363 and 379 are selected to define a voltage swing at node 303 for normal operation such that the output of the voltage reference IC 355 bears a linear relationship to the input sense voltage $V_{sense}$, and IC 355 does not switch completely on or off. The voltage reference IC 355 responds to load transients by increasing or decreasing the amount of current it draws. Should significant load transients occur, the voltage reference IC 355 saturates and switches either completely on or off, depending on the polarity of the load transient. The DC—DC converter 300 therefore has improved transient response when compared to some prior DC—DC converters.

The output (pin 1) of the voltage reference IC 355 is coupled to VDD via resistor 371, which, for this embodiment, has a value of 100Ω. The output of the voltage reference IC 355 acts as a current sink, and the amount of current drawn by the voltage reference IC is determined by a comparison between the sense voltage $V_{sense}$ and the reference voltage $V_{ref}$ of the voltage reference IC 355. If the sense voltage $V_{sense}$ is less than reference voltage $V_{ref}$, voltage reference IC 355 sinks less current, which raises the voltage at the output of the voltage reference IC 355.

The voltage at the output of the voltage reference IC 355 is coupled to the base of pnp transistor 357 via resistor 375. For this embodiment, transistor 357 may be a 3906 transistor, and resistor 375 may have a value of 510Ω. Transistor 357 is switched off when the voltage at the output of voltage reference IC 355 is sufficiently high such that the pre-drive signal is set to ground by the pull-down resistor 377, which may have a value of 2.7 kΩ. The pre-drive signal, via resistor 379, provides a hysteresis voltage $V_{hyst}$ that drives the sense voltage $V_{sense}$ a few millivolts lower. The hysteresis voltage $V_{hyst}$ is out of phase with the output ripple voltage.

If the sense voltage $V_{sense}$ at node 303 is greater than the reference voltage $V_{ref}$, voltage reference IC 355 sinks more current, which lowers the voltage at the output of the voltage reference IC 355. When the voltage at the output of the voltage reference IC 355 is sufficiently low, transistor 357 is switched on, coupling VDD to its collector such that the pre-drive voltage $V_{predrive}$ at node 304 starts to rise towards VDD. When the value of the pre-drive voltage $V_{predrive}$ at node 304 exceeds the threshold voltage of transistor 335, transistor 335 switches on, switching off power switching transistor 305. The voltage at node 304, via resistor 379, provides the hysteresis voltage $V_{hyst}$ to drive the voltage at node 303 a few millivolts higher.

For the DC—DC converter of FIG. 3, the frequency of oscillation is approximately 80 kHz. The loop gain is set primarily by the values of resistors 361, 365, and 385, and capacitors 387 and 389. The value of resistor 385 may be 22 kΩ, the value of capacitor 387 may be 100 pF, and the value of capacitor 389 may be 0.01 µF.

The precision of DC—DC converter 300 is determined primarily by the accuracy of the internal set-point reference of the voltage reference IC 355 and the accuracy of resistors 361 and 365. As described above, the accuracy of the voltage reference IC 355 is approximately ±1%, and the accuracy of resistors 361 and 365 is ±0.1%. Therefore, the DC—DC converter 300 outputs a DC output voltage that is within approximately ±1.05% of its nominal value.

Figure 4:
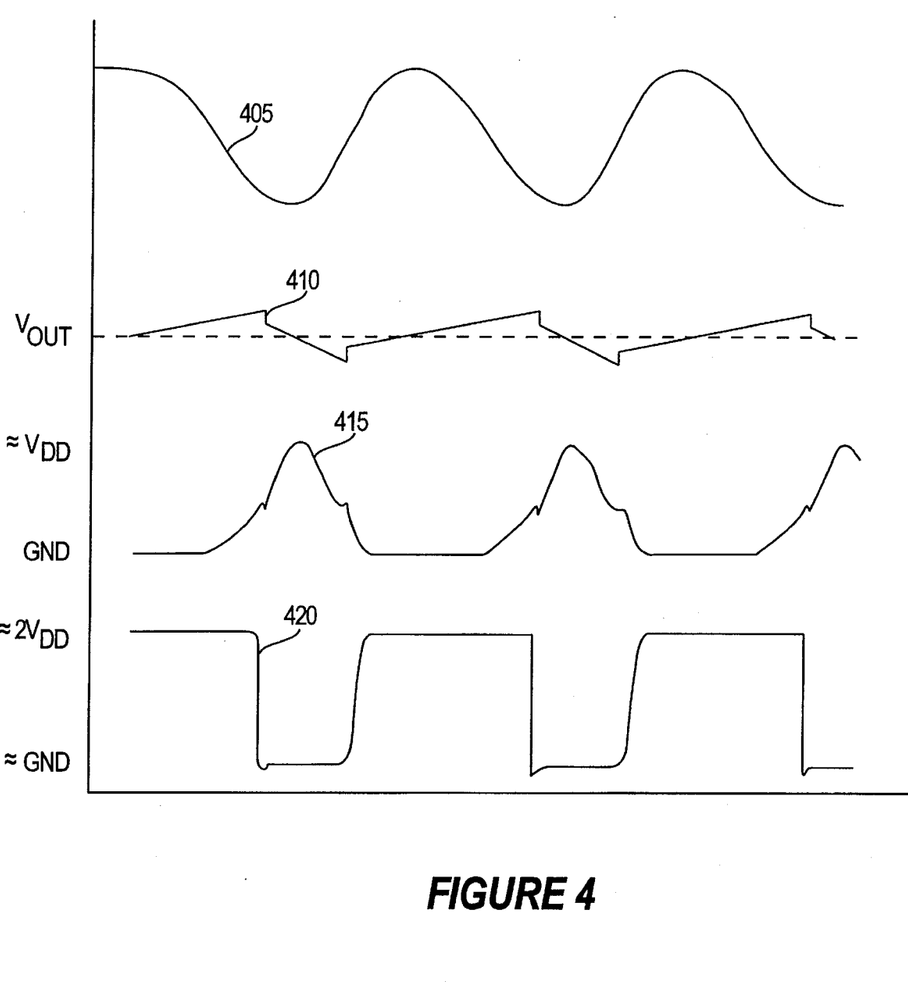
FIG. 4 shows waveforms that illustrate operation of the DC—DC converter shown in FIG. 3.

FIG. 4 shows waveforms that illustrate the operation of the DC—DC converter shown in FIG. 3. Waveform 405 shows the voltage at the output of the voltage reference IC 355. Waveform 410 shows the ripple voltage of the output stage 210. Waveform 415 shows the pre-drive signal applied to the gate of transistor 335. Waveform 420 shows the drive signal applied to the gate of power switching transistor 305.

As shown, the highest voltage at the output of the voltage reference IC 355 occurs when the output voltage $V_{out}$ is at its nominal value and increasing, wherein the lowest voltage at the output of the voltage reference IC 355 occurs when the output voltage $V_{out}$ is at its nominal value and decreasing. As the voltage at the output of the voltage reference IC 355 falls, the value of the pre-drive signal begins to rise. Prior to the time when the pre-drive signal exceeds the threshold voltage of transistor 335, the pre-drive signal and the output voltage $V_{out}$ both rise in value. Resistor 379 couples the rising pre-drive signal to the input of the voltage reference IC 355 such that $V_{sense}$ is forced higher. The voltage reference IC 355 responds by sinking more current, reducing the voltage at its output.

When the value of the pre-drive signal exceeds the threshold voltage of transistor 335, transistor 335 switches on, removing the drive signal from the gate of power switching transistor 305 such that the output voltage begins to fall, as shown by waveform 410. The pre-drive signal continues to rise until the voltage reference IC 355 senses that $V_{sense}$ is less than $V_{ref}$, at which time the voltage reference IC 355 begins to sink less current, raising the voltage at its output. The pre-drive signal falls until the transistor 335 is switched off, at which time a drive pulse is again applied to the gate of power switching transistor 305, and the voltage at the output stage of the DC—DC converter begins to rise. As shown, the voltage at the output of the voltage reference IC 355 oscillates such that the process described above repeats, resulting in a series of pre-drive pulses at node 304 and drive pulses at node 301.

The DC—DC converter varies both the frequency of oscillation and the duty cycle to produce the desired output voltage for different load currents. For example, as the DC load current supplied at the output of the DC—DC converter increases, the frequency of oscillation tends to decrease, and the duty cycle tends to increase. Similarly, as the DC load current supplied at the output of the DC—DC converter decreases, the frequency of oscillation tends to increase, while the duty cycle tends to decrease. This behavior may be contrasted with prior art switching regulator circuits wherein either the frequency or the duty cycle typically remains fixed while the other attribute is varied.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A switching regulator circuit comprising:

a primary feedback loop comprising a drive circuit, a switching transistor, an output stage, and a pre-drive circuit coupled in series, the pre-drive circuit further being coupled to the drive circuit, the primary feedback loop using negative feedback to output a predetermined output voltage at the output stage; and a feedback circuit coupled between an input and an output of the pre-drive circuit, the feedback using regenerative feedback to provide hysteresis which causes the primary feedback loop to oscillate.

2. The switching regulator circuit of claim 1, wherein the pre-drive circuit comprises a voltage reference circuit that outputs a signal in response to a comparison between a sense voltage and a reference voltage, the sense voltage depending on the output voltage output by the output stage and a hysteresis voltage provided by the feedback circuit such that the signal output by the voltage reference circuit oscillates.

3. The switching regulator circuit of claim 2, wherein the primary feedback loop further comprises:

a voltage divider circuit coupled in series between the output stage and the pre-drive circuit, the voltage divider circuit comprising a first resistor and a second resistor coupled in series between the output voltage and ground, the voltage divider circuit outputting the sense voltage at a node between the first and second resistors in response to the output voltage.

4. The switching regulator circuit of claim 2, wherein the drive circuit comprises an input coupled to receive a pre-drive signal, the drive circuit outputting a drive signal in response to the pre-drive signal;

the switching transistor comprises a first electrode coupled to a first input voltage, a second electrode, and a control electrode for coupling and decoupling the first electrode and the second electrode in response to the drive signal; and the output stage comprises an input coupled to the second electrode of the switching transistor and an output for outputting the output voltage in response to the first input voltage being coupled and decoupled from the second electrode of the switching transistor.

5. The switching regulator circuit of claim 4, wherein the pre-drive circuit further comprises:

a second transistor having a first electrode coupled to a second input voltage, a second electrode coupled to ground, and a control electrode coupled to the comparison voltage, the second transistor for outputting the pre-drive signal at the second electrode in response to the signal output by the voltage reference circuit.

6. The switching regulator circuit of claim 5, wherein the feedback circuit comprises a resistor coupled between the input and the output of the pre-drive circuit, the feedback circuit altering the value of the sense voltage in response to the pre-drive signal.

7. The switching regulator circuit of claim 5, wherein the drive circuit further comprises:

a third transistor having a first electrode coupled to the second input voltage, a second electrode coupled to ground, and a control electrode coupled to the pre-drive signal for coupling and decoupling the first electrode of the third transistor to the second electrode of the third transistor in response to the pre-drive signal such that the drive signal at the first electrode of the third transistor is varied.

8. A switching regulator circuit comprising:

a switching transistor having a first electrode coupled to a first input voltage, a second electrode, and a control electrode for coupling and decoupling the first electrode and the second electrode in response to a drive signal;

a drive circuit having an input coupled to receive a pre-drive signal and an output coupled to the control electrode of the switching transistor, the drive circuit providing the drive signal to the switching transistor in response to the pre-drive signal;

an output stage having an input coupled to the second electrode of the switching transistor and an output that outputs an output voltage in response to the first input voltage being coupled and decoupled from the second electrode of the switching transistor;

a pre-drive circuit having an input coupled to sense the output voltage and an output coupled to the input of the drive circuit, the pre-drive circuit for outputting the pre-drive signal to the drive circuit in response to a comparison between a reference voltage and the output voltage; and a feedback circuit between the input and the output of the pre-drive circuit for providing hysteresis which causes the pre-drive circuit to periodically pulse the pre-drive signal.

9. The switching regulator circuit of claim 8, wherein the pre-drive circuit comprises:

a voltage reference circuit coupled to sense the output voltage, the voltage reference circuit including a voltage reference having the reference voltage, the voltage reference circuit outputting a comparison voltage in response to comparing the output voltage to the voltage reference; and a second transistor having a first electrode coupled to a second input voltage, a second electrode coupled to ground, and a control electrode coupled to the comparison voltage, the second transistor for outputting the pre-drive signal at the second electrode in response to the comparison voltage.

10. The switching regulator circuit of claim 9, wherein the drive circuit comprises:

a third transistor having a first electrode coupled to the second input voltage, a second electrode coupled to ground, and a control electrode coupled to the pre-drive signal for coupling and decoupling the first electrode of the third transistor to the second electrode of the third transistor in response to the pre-drive signal such that the drive signal at the first electrode of the third transistor is varied.

11. The switching regulator circuit of claim 8, further comprising a voltage divider circuit disposed between the output of the output stage and the input of the pre-drive circuit, the voltage divider circuit providing a divider voltage to the input of the pre-drive circuit in response to the output voltage, and the feedback circuit coupling a hysteresis voltage to the input of the pre-drive circuit in response to the pre-drive signal such that the pre-drive circuit senses a sense voltage that varies in response to the output voltage and the pre-drive signal.

12. A switching regulator circuit comprising:

a first transistor having a first electrode coupled to a first input voltage, a second electrode, and a control electrode coupled to receive a drive signal, the control electrode for coupling and decoupling the first electrode to the second electrode in response to the drive signal;

a drive circuit having a first input coupled to a second input voltage, a second input coupled to a pre-drive signal and an output coupled to the control electrode of the first transistor, the drive circuit supplying the drive signal to the first transistor in response to the pre-drive signal;

an output stage having an input coupled to the second electrode of the first transistor and an output for outputting an output voltage in response to the first input voltage being coupled and decoupled from the second electrode of the first transistor;

a voltage divider circuit having an input coupled to the output voltage, the voltage divider outputting a sense voltage in response to the output voltage;

a pre-drive circuit having an input coupled to the sense voltage and an output coupled to the second input of the drive circuit, the pre-drive circuit for outputting the pre-drive signal to the drive circuit in response to a comparison between a reference voltage and the sense voltage; and a feedback circuit coupled between the input and the output of the pre-drive circuit, the feedback circuit for providing hysteresis to the sense voltage which causes the pre-drive circuit to periodically pulse the pre-drive signal.

13. A switching regulator circuit comprising:

a first transistor having a first electrode coupled to a first input voltage, a second electrode, and a control electrode coupled to receive a drive signal;

a drive circuit having a first input coupled to a second input voltage, a second input coupled to a pre-drive signal and an output coupled to the control electrode of the first transistor, the drive circuit comprising:
  a second transistor having a first electrode coupled to the control electrode of the first transistor, a second electrode coupled to the ground, and a control electrode that is the second input of the drive circuit, the second transistor for setting the drive signal approximately to ground when the second transistor is switched on, wherein the second input sets the drive signal approximately to the second input voltage when the second transistor is switched off;

an output stage having an input coupled to the second electrode and an output for outputting an output voltage in response to the first input voltage being coupled and decoupled from the second electrode of the first transistor;

a voltage divider circuit having an input coupled to the output voltage, the voltage divider outputting a sense voltage in response to the output voltage;

a pre-drive circuit having an input coupled to the sense voltage and an output coupled to the second input of the drive circuit, the pre-drive circuit for outputting the pre-drive signal to the drive circuit in response to a comparison between a reference voltage and the sense voltage; and a feedback circuit coupled between the input and the output of the pre-drive circuit, the feedback circuit for providing hysteresis to the sense voltage which causes the pre-drive circuit to periodically pulse the pre-drive signal.

14. A method for regulating an output voltage of a switching regulator circuit comprising the steps of:

generating the output voltage in response to a power switching transistor being switched on and off;

generating a hysteresis voltage in response to the output voltage, wherein the hysteresis voltage is out of phase with the output voltage;

generating a sense voltage in response to the output voltage and the hysteresis voltage;

comparing the sense voltage to a reference voltage; and changing the output voltage and the hysteresis voltage in response to comparing the sense voltage to the reference voltage without introducing a separate oscillating signal such that the power switching transistor is switched on and off, resulting in the output voltage oscillating between a minimum value and a maximum value.

* * * * *

UNITED STATES PATENT AND TRADEMARK OFFICE
CERTIFICATE OF CORRECTION

PATENT NO. : 5,587,650
DATED : December 24, 1996
INVENTOR(S) : Harold L. Massie

It is certified that error appears in the above-indentified patent and that said Letters Patent is hereby corrected as shown below:

In column 8 at line 58 insert --circuit-- following "feedback" and prior to "using"

Signed and Sealed this

Fifteenth Day of April, 1997

Attest:

BRUCE LEHMAN

Attesting Officer

Commissioner of Patents and Trademarks